(12) United States Patent
Kalamatianos et al.

(10) Patent No.: US 11,714,652 B2
(45) Date of Patent: Aug. 1, 2023

(54) ZERO OPERAND INSTRUCTION CONVERSION FOR ACCELERATING SPARSE COMPUTATIONS IN A CENTRAL PROCESSING UNIT PIPELINE

(71) Applicant: Advanced Micro Devices, Inc., Santa Clara, CA (US)

(72) Inventors: John Kalamatianos, Boxborough, MA (US); Ganesh Dasika, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 7 days.

(21) Appl. No.: 17/384,646

(22) Filed: Jul. 23, 2021

(65) Prior Publication Data

US 2023/0024089 A1    Jan. 26, 2023

(51) Int. Cl.
    *G06F 9/38*        (2018.01)
    *G06F 9/30*        (2018.01)

(52) U.S. Cl.
    CPC .......... *G06F 9/3832* (2013.01); *G06F 9/3001* (2013.01); *G06F 9/30181* (2013.01)

(58) Field of Classification Search
    CPC .. G06F 9/3832; G06F 9/30181; G06F 9/3824; G06F 9/3001
See application file for complete search history.

(56) References Cited

U.S. PATENT DOCUMENTS

| | | | | |
|---|---|---|---|---|
| 5,262,973 A | * | 11/1993 | Richardson | G06F 7/50 708/525 |
| 7,222,226 B1 | * | 5/2007 | Lepak | G06F 9/3842 712/225 |
| 7,502,918 B1 | * | 3/2009 | Barowski | G06F 9/3836 712/226 |
| 7,631,207 B1 | * | 12/2009 | Song | G06F 9/3016 713/323 |
| 7,788,473 B1 | * | 8/2010 | Nelson | G06F 9/3832 712/225 |
| 8,255,726 B2 | * | 8/2012 | Barowski | G06F 9/30105 713/320 |
| 9,223,575 B2 | * | 12/2015 | Moloney | G06F 9/3016 |
| 9,817,466 B2 | * | 11/2017 | Sideris | G06F 9/3869 |
| 10,459,727 B2 | * | 10/2019 | Chilimbi | G06F 9/3802 |
| 2004/0255099 A1 | * | 12/2004 | Kromer | G06F 9/384 712/E9.046 |
| 2015/0254077 A1 | * | 9/2015 | Boettcher | G06F 9/30072 712/4 |
| 2021/0165654 A1 | * | 6/2021 | Carlson | G06F 9/30003 |

(Continued)

OTHER PUBLICATIONS

Mafijul Md. Islam and Per Stenstrom, "Zero-Value Caches: Cancelling Loads that Return Zero", Sep. 25, IEEE, pp. 238-245 (Year: 2009).*

(Continued)

*Primary Examiner* — Courtney P Carmichael-Moody
(74) *Attorney, Agent, or Firm* — Greenberg Traurig, LLP

(57) ABSTRACT

A processing device includes a zero detection circuit to determine that an operand of a first instruction is zero and instruction conversion logic coupled with the zero detection circuit to, in response to the zero detection circuit determining that the operand is zero, convert the first instruction to a register move instruction executable by the processing device.

21 Claims, 5 Drawing Sheets

(56) References Cited

U.S. PATENT DOCUMENTS

2021/0311742 A1* 10/2021 Greenhalgh ........ G06F 9/30098

OTHER PUBLICATIONS

Ehsan Atoofian and Amirali Baniasadi, "Improving Energy-Efficiency by Bypassing Trivial Computations", Apr. 18, IEEE (Year: 2005).*

Md. Mafijul Islam and Per Stenstrom, "Reduction of Energy Consumption in Processors by Early Detection and Bypassing of Trivial Operations", Feb. 5, IEEE, pp. 28-34 (Year: 2005).*

Asgari, B., Hadidi, R., Krishna, T., Kim, H., & Yalamanchili, S. (Feb. 2020). Alrescha: A lightweight reconfigurable sparse-computation accelerator. In 2020 IEEE International Symposium on High Performance Computer Architecture (HPCA) (pp. 249-260). IEEE.

Challapalle, N., Rampalli, S., Song, L., Chandramoorthy, N., Swaminathan, K., Sampson, J., . . . & Narayanan, V. (May 2020). GaaS-X: Graph analytics accelerator supporting sparse data representation using crossbar architectures. In 2020 ACM/IEEE 47th Annual International Symposium on Computer Architecture (ISCA) (pp. 433-445). IEEE.

Chen, Y. H., Yang, T. J., Emer, J., & Sze, V. (2019). Eyeriss v2: A flexible accelerator for emerging deep neural networks on mobile devices. IEEE Journal on Emerging and Selected Topics in Circuits and Systems, 9(2), 292-308.

Hwang, R., Kim, T., Kwon, Y., & Rhu, M. (May 2020). Centaur: A chiplet-based, hybrid sparse-dense accelerator for personalized recommendations. In 2020 ACM/IEEE 47th Annual International Symposium on Computer Architecture (ISCA) (pp. 968-981). IEEE.

Lipasti, M. H., Wilkerson, C. B., & Shen, J. P. (Sep. 1996). Value locality and load value prediction. In Proceedings of the seventh international conference on Architectural support for programming languages and operating systems (pp. 138-147).

Qin, E., Samajdar, A., Kwon, H., Nadella, V., Srinivasan, S., Das, D., . . . & Krishna, T. (Feb. 2020). Sigma: A sparse and irregular gemm accelerator with flexible interconnects for dnn training. In 2020 IEEE International Symposium on High Performance Computer Architecture (HPCA) (pp. 58-70). IEEE.

Reinman, G., & Calder, B. (Dec. 1998). Predictive techniques for aggressive load speculation. In Proceedings. 31st Annual ACM/IEEE International Symposium on Microarchitecture (pp. 127-137). IEEE.

Srivastava, N., Jin, H., Liu, J., Albonesi, D., & Zhang, Z. (Oct. 2020). Matraptor: A sparse-sparse matrix multiplication accelerator based on row-wise product. In 2020 53rd Annual IEEE/ACM International Symposium on Microarchitecture (MICRO) (pp. 766-780). IEEE.

Srivastava, N., Jin, H., Smith, S., Rong, H., Albonesi, D., & Zhang, Z. (Feb. 2020). Tensaurus: A versatile accelerator for mixed sparse-dense tensor computations. In 2020 IEEE International Symposium on High Performance Computer Architecture (HPCA) (pp. 689-702). IEEE.

Yang, D., Ghasemazar, A., Ren, X., Golub, M., Lemieux, G., & Lis, M. (Oct. 2020). Procrustes: a dataflow and accelerator for sparse deep neural network training. In 2020 53rd Annual IEEE/ACM International Symposium on Microarchitecture (MICRO) (pp. 711-724). IEEE.

Zhang, Z., Wang, H., Han, S., & Dally, W. J. (Feb. 2020). Sparch: Efficient architecture for sparse matrix multiplication. In 2020 IEEE International Symposium on High Performance Computer Architecture (HPCA) (pp. 261-274). IEEE.

* cited by examiner

ZERO OPERAND INSTRUCTION CONVERSION FOR ACCELERATING SPARSE COMPUTATIONS IN A CENTRAL PROCESSING UNIT PIPELINE

BACKGROUND

In computing, a sparse matrix is a matrix having elements that are mostly zeros, with relatively few nonzero elements. Sparse matrices are useful for modeling computational problems in network theory, numerical analysis, machine learning, and numerous other fields. Computations involving sparse matrices are inefficient when executed using standard dense-matrix algorithms due to the large proportion of zeros, which waste processing resources, memory, and power. In addition, computations involving very large sparse matrices may be infeasible using such standard algorithms.

Some specialized approaches for storing and manipulating sparse matrices take advantage of their sparsity to allow for more efficient computation. For example, one characteristic of sparse matrices is that they are more easily compressed at a high ratio, and thus consume much less memory than similarly-dimensioned dense matrices. Computations can then be performed using the compressed version of the sparse matrix. However, due to the computational cost incurred by the compression process itself, it can be impractical to compress dynamic or frequently changing sparse matrices.

BRIEF DESCRIPTION OF THE DRAWINGS

The present disclosure is illustrated by way of example, and not by way of limitation, in the figures of the accompanying drawings.

DETAILED DESCRIPTION

Figure 1:
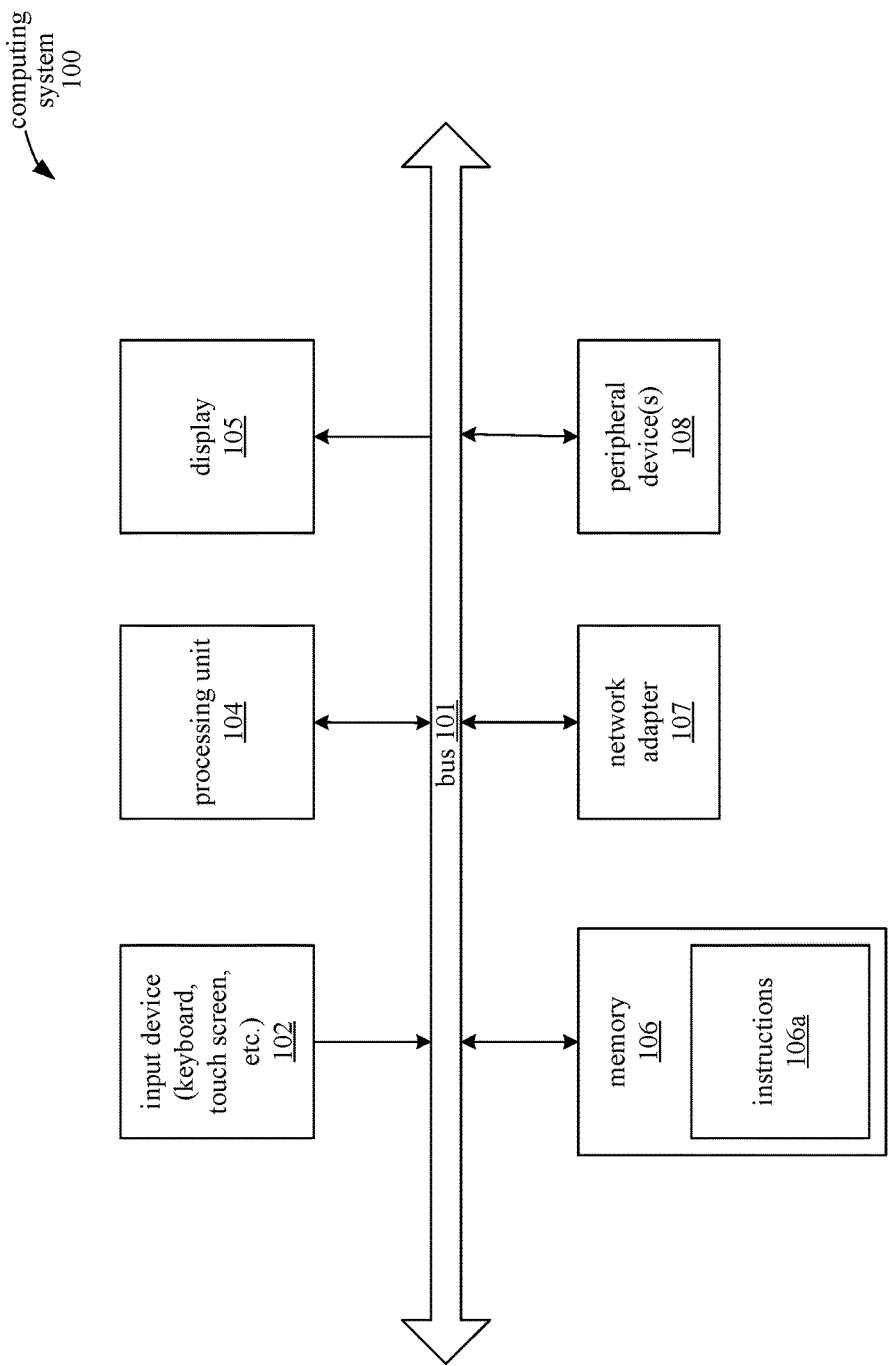
FIG. 1 illustrates an implementation of a computing system that supports the conversion of consumer instructions with zero-valued operands to register move instructions.

The following description sets forth numerous specific details such as examples of specific systems, components, methods, and so forth, in order to provide a good understanding of the implementations. It will be apparent to one skilled in the art, however, that at least some implementations are practiced without these specific details. In other instances, well-known components or methods are not described in detail or are presented in a simple block diagram format in order to avoid unnecessarily obscuring the implementations. Thus, the specific details set forth are merely exemplary. Particular implementations vary from these exemplary details and are still contemplated to be within the scope of the implementations.

Computations involving sparse data structures (e.g. matrices/vectors/linked lists/graphs with elements carrying a majority of zero values) are critical for certain market segments including high performance computing (HPC), machine learning, data analytics, graph processing, and scientific computing.

"Zero skipping" describes a sparse compute elision approach in which computations and data movement are elided for zero-valued operands in order to reduce energy consumption and increase performance. In one approach, zeroes are almost entirely eliminated using a dedicated sparse data structure (such as compressed sparse row (CSR), sliced ELLPACK (SELL), etc.), and specialized routines are used to traverse these sparse data structures efficiently. This approach can be effective when the locations of the zeroes in the sparse matrices being processed are known ahead of time. However, for many applications, the locations of the zeros are not known ahead of time. Of particular note is neural network inference where zeroes occur as a results of activations and are input-dependent, making it impossible to know where they will occur before the program starts executing.

Computations involving zero values can be redundant depending on the type of operation (e.g. multiplying by 0, adding 0 to another operand, logical operations with a zero operand, etc.). In addition, data movement operations that load zero values are also redundant. If detected early under certain conditions, the memory traffic can be avoided, saving dynamic energy and memory bandwidth, and decreasing latency.

In one implementation, hardware and software support can be provided for converting arithmetic, logical and data movement instructions into register move instructions if one or more of the operands has a zero value. A processing unit detects when an instruction has a zero operand, then converts the instruction to a register move instruction depending on the type of operation indicated by the instruction. This allows operations on sparse matrices or vectors to be sped up when running on central processing unit (CPU) cores by reducing the instructions issued to execution units and effectively increasing Instruction Level Parallelism (ILP) and instructions per cycle (IPC).

This technique, in which instructions with zero-valued operands are converted into more efficient register move operations, does not require that the locations of zeros be known beforehand, and can thus be effectively used in applications where sparse data structures are dynamically or frequently modified, and without relying on compiler-based optimizations. In addition, the computational overhead for converting the sparse data structures to a compressed format such as CSR or SELL is avoided.

FIG. 1 illustrates an implementation of a computing system 100 which implements the instruction conversion mechanism as described above. In general, the computing system 100 is embodied as any of a number of different types of devices, including but not limited to a laptop or desktop computer, mobile phone, server, etc. The computing system 100 includes a number of components 102-108 that can communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical casing, such as a laptop or desktop chassis, or a mobile phone casing. In alternative implementations, some of the components of computing system 100 are embodied as peripheral devices such that the entire computing system 100 does not reside within a single physical casing.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 include mass storage devices, location detection devices, sensors, input devices, or other types of devices that can be used by the computing system 100.

Computing system 100 includes a processing unit 104 that receives and executes instructions 106a that are stored in the main memory 106. As referenced herein, processing unit 104 represents a processor "pipeline", and could include central processing unit (CPU) pipelines, graphics processing unit (GPU) pipelines, or other computing engines that support memory operations that use virtual addresses. Main memory 106 is part of a memory subsystem of the computing system 100 that includes memory devices used by the computing system 100, such as random-access memory (RAM) modules, read-only memory (ROM) modules, hard disks, and other non-transitory computer-readable media.

In addition to the main memory 106, the memory subsystem also includes cache memories, such as level 2 (L2) or level 3 (L3) caches, and/or registers. Such cache memory and registers are present in the processing unit 104 or on other components of the computing system 100.

Figure 2:
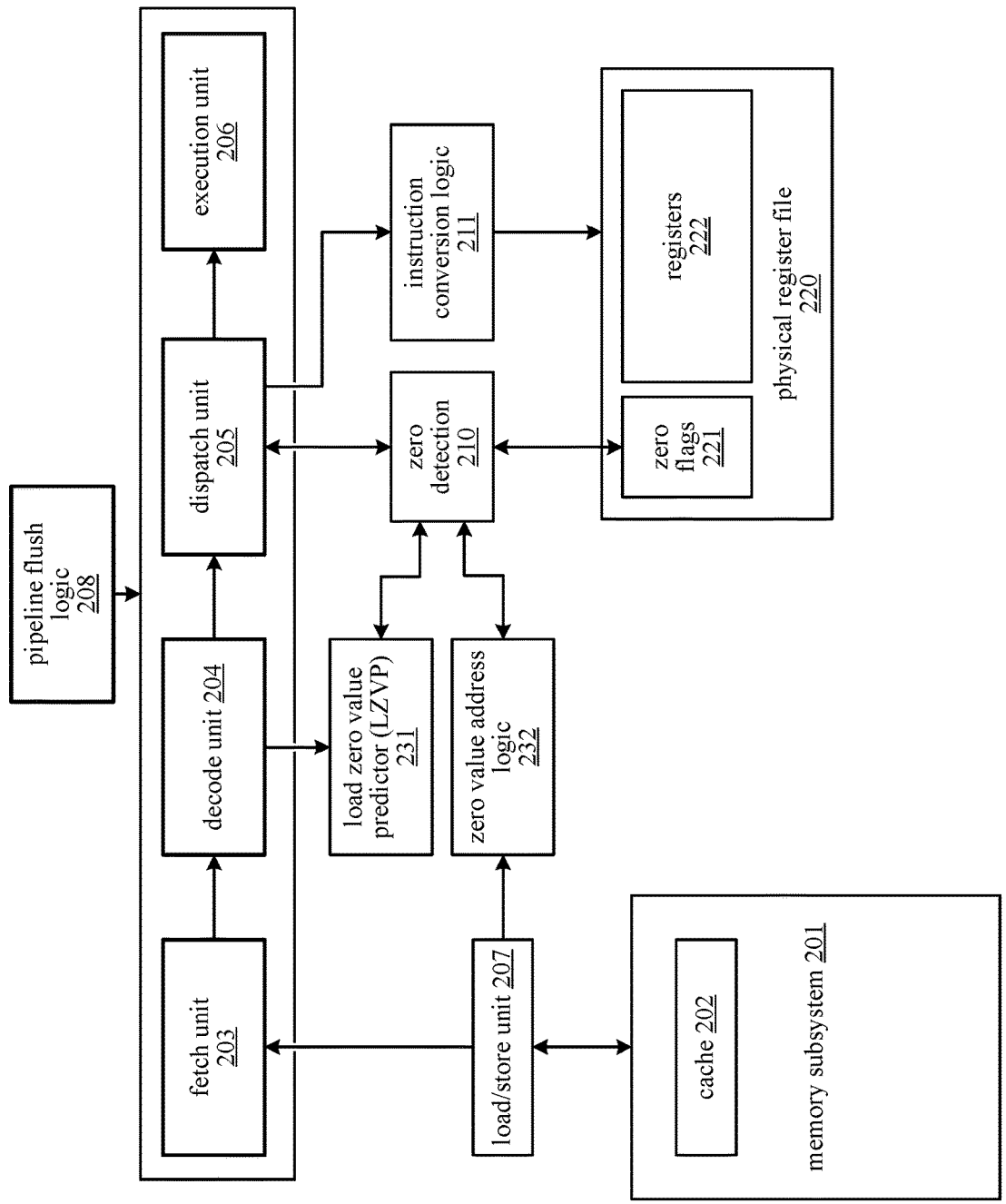
FIG. 2 illustrates components in a processing unit for converting consumer instructions with zero-valued operands to register move instructions, according to an implementation.

FIG. 2 is a block diagram illustrating hardware components utilized by one or more processing cores (e.g., in processing unit 104) in which instructions with zero-valued operands are converted to register move operations, according to an implementation. Each of the blocks illustrated in FIG. 2 represents hardware circuitry in the processing unit 104 and/or the computing system 100, with functionality defined by the hardware or a combination of hardware, software and/or firmware. The processing pipeline includes the fetch unit 203, decode unit 204, dispatch unit 205, and execution unit 206. The fetch unit 203 retrieves instructions to be executed from the memory subsystem 201, facilitated by a cache device 202. Fetched instructions are decoded in the decode unit 204 so the processing unit 104 can determine which operation will be executed and how many operands will be used. The dispatch unit sends the instructions to the appropriate queues for the functional units in the execution unit 206 that will execute them. Each instruction is then executed by the appropriate functional unit in the execution unit 206 when its operands are ready.

The memory subsystem 201 is implemented using multiple types of memory, with various operating characteristics. For example, the memory subsystem 201 can include lower level cache memory, main memory, nonvolatile memory, etc. that differ in access latency, capacity, power consumption, and other characteristics. The various memory devices that make up the memory subsystem 201 are coupled together in a hierarchical structure, referenced herein as the memory hierarchy. The load/store unit 207 handles reading and writing of data to and from the memory subsystem 201.

In one implementation, the physical register file 220 is memory in the processing unit 104 that includes an array of registers 222 that store data for imminent use by the processing unit 104, such as operands for instructions in the processing pipeline. Each of the registers 222 is addressed by a physical register number (PRN). Operands can be loaded into the physical register file 220 by load instructions, and subsequently used in computations by a consumer instruction being executed. Each load instruction, when executed, causes a data value (i.e., a load value) to be copied from a physical source address (e.g., in the memory hierarchy) to a destination address (e.g., a destination register in the physical register file 220).

Each of the physical registers 222 is associated with a physical bit, representing a zero flag. When a load instruction is received and processed in the pipeline, a zero detection logic circuit 210 determines whether the load instruction indicates storing of a zero value at a destination register in the registers 222. If so, the zero detection logic 210 asserts the zero flag associated with the destination register of the load instruction. The zero detection logic 210 also asserts zero flags for registers that are set to zero by other mechanisms (e.g., register moves, etc.). The zero detection logic 210 deasserts the zero flag for registers that are set to nonzero values; thus, each zero flag is asserted when its associated register is storing a zero value and is deasserted when the register stores a nonzero value, whether the zero or nonzero value is a result of an executed consumer instruction, register move instruction, or any other write operation directed to the register. In one implementation, the zero flag of a register is asserted when the zero detection logic 210 determines that the register value is changing from a nonzero value to a zero value, and is deasserted when the value changes from a zero value to a nonzero value. Thus, any zero values stored in the registers 222 that will later be used as operands in a subsequent consumer instruction are marked as zero values by their respective zero flags 221. In one implementation, each of the zero flags 221 is associated with an address (i.e., the PRN) of its corresponding register of the registers 222.

A consumer instruction of an operand is the instruction that consumes the operand by using the operand in an operation. For example, an addition instruction that adds two operands A and B is a consumer of A and B. When a consumer instruction is queued at the dispatch pipeline stage and its source operands become ready for reading from the physical register file 220, the zero detection logic circuit 210 detects whether any of the source operands is zero. The zero detection logic 210 determines whether the source operand is zero by checking the zero flag for the register in which the operand is stored. If the zero flag is asserted, the operand is determined to be zero. If the zero flag is not asserted, the operand is determined to be a nonzero value. For instructions that have multiple operands, the zero detection logic 210 determines for each operand whether the operand is zero.

If at least one of the operands of a consumer instruction is zero, the instruction conversion logic 211 converts the consumer instruction to a register move instruction depending on its arithmetic or logical operation type. The register move instruction is then executed by the processing unit 104 instead of the original consumer instruction. Some examples of instructions that can be converted to register moves are multiply by zero, add zero, subtract zero, logical AND with zero, etc.

For example, an instruction that multiplies an operand A by zero, or a logical AND of A and zero, is converted to a register move instruction that moves zero into the result register. An instruction that adds an operand B and zero, or that subtracts zero from B, is converted to a register move instruction that moves B into the result register. In a further example, an instruction is received indicating that the values in registers R1 and R2 are to be added together and the result stored in register R3. If register R2 is determined to hold a zero value, then instead of dispatching an instruction to add R1 to zero and store the result in R3, the original instruction is converted to a register move instruction that is executed by dedicated register logic that copies the contents of R1 to R3. In cases where the generated register move instruction moves a zero value into a destination register, the zero flag for the destination register is asserted so the conversion optimization is available for subsequent consumer instructions that have not been dispatched by the time the destination register is updated in the physical register file 220.

The same result is thus achieved using a more efficient register move operation that is executed independently of the main pipeline and does not consume pipeline resources. A register move is an instruction that does not need to be issued to an execution unit, and does not need to occupy an instruction scheduler slot. Therefore, the conversion of a consumer instruction to a register move instruction saves execution bandwidth and lowers instruction scheduler occupancy. Power consumption can also be decreased because a register move often consumes less power than the original instruction.

Some applications, such as HPC and machine learning, process sparse data structures (e.g. matrices and/or vectors) using vectorized code (e.g., single instruction multiple data (SIMD) instructions). The above register move conversion technique can be applied on vector multiply, add, subtract, logical, and other instructions where one source vector operand has a zero value (i.e., all its elements are zero). The source operand of the vector instruction can be a scalar or vector. The source operand can be a scalar in the case of matrix-vector multiplication (when multiplying a vector element with the elements of a matrix row) or a vector in the case of matrix-matrix multiplication. The zero detection logic 210 determines whether an operand of a vector instruction is zero (for scalar operands) or has all of its elements equal to zero (for vector operands). If so, the instruction conversion logic 211 converts the original instruction to a vectorized register move instruction that moves values into a destination vector register in a vector physical register file.

The above conversion of instructions to register move operations is non-speculative; however, in one implementation, speculative conversion of instructions to register moves can also be performed based on predicting zero-valued operands. Identifying load instructions that load a zero values from memory 201 can also accelerate sparse computations. However, the load destination values are detected as zero after the load has been issued to the memory system 201. That is, the load instruction fetches the value to be stored from the memory system 201, then stores the fetched value in a destination register in the physical register file 220. As the value is stored in the register file 220, the zero detection logic 210 checks its bits to determine whether the value is zero and, if so, asserts the destination register's zero flag.

However, in usual cases where the consumer instruction in the executable code closely follows the load instruction for its operands, it is possible that the consumer instruction has reached the instruction scheduling stage before the load instruction stores the operand value in the register file 220. Thus, the zero-valued operand is known to be zero after the consumer instruction has already reached the instruction scheduler, and is already consuming resources in the pipeline. In this case, the consumption of pipeline resources is not avoided by converting the consumer instruction to a register move.

In one implementation, the processing unit 104 includes a load zero value predictor (LZVP) 231. The LZVP 231 predicts when operands are likely to be zero values so that so that the consumer instruction can be speculatively converted to a register move operation and eliminated from the pipeline before it enters the instruction scheduling stage. The LZVP 231 maintains a table that stores program counters each associated with a confidence counter value. When the zero detection logic 210 detects a load instruction that stores a zero value, the LZVP 231 records the program counter of the load instruction in an entry in the LZVP 231 if it does not already exist, and increments the confidence counter associated with the program counter. Thereafter, the LZVP 231 increments the confidence counter every time a subsequent instance of the load instruction having the same program counter value loads a zero value. When an instance of the load instruction is detected that loads a nonzero value, the confidence counter is decreased (e.g., decremented or alternatively, reset).

Thus, the LZVP 231 is trained based on prior instances of the load instruction to predict whether future instances of the load instruction will load a zero value. When another instance of the load instruction (as identified by its program counter) is fetched and decoded at the decode unit 204, and the confidence counter for a program counter exceeds a threshold confidence level, the LZVP 231 can already predict that the load instruction will load a zero into its destination register before accessing the cache or memory system 201. Accordingly, the LZVP 231 asserts the zero flag for the load instruction's destination register in the physical register file 220. Since this prediction is available before the actual value is returned from memory 201, it can be used to speculatively convert a consumer instruction to a register move operation before the consumer instruction reaches the scheduling stage. When the consumer instruction has reached the dispatch unit 205, the zero detection logic 215 determines that its operand is predicted to be zero by determining that the zero flag for the operand's register is asserted. The consumer instruction can then be converted to a register move operation as previously described.

When an operand is predicted to have a zero value and its consumer instruction is speculatively converted to a register move operation, the speculated load instruction is issued and executed on the pipeline in order to validate the speculation based on the actual operand data read from the memory hierarchy. When the load instruction fetches the actual operand value from the memory hierarchy, the LZVP 231 checks its table to determine whether the value was previously predicted to be zero. For example, if the confidence counter for the load instruction's program counter exceeds the confidence threshold, then a zero value for the load's destination would have been predicted. In another example, the load instruction carries over a bit indicating if it was predicted to fetch a zero value or not. If the value was predicted to be zero and the actual value fetched from memory is also zero, then the speculation was correct and no further action is taken.

If the speculation is incorrect (i.e., the value was predicted to be zero and the actual fetched value was not zero), then the pipeline is flushed, and the fetch unit 203 fetches instructions starting from the mis-speculated load instruction. In one implementation, the pipeline is flushed using the same pipeline flush logic 208 used for handling branch mispredictions or other data mis-speculations. Additional conditional logic is included in the pipeline flush logic 208 to trigger the flush based on incorrect zero value predictions.

In one implementation, the processing unit 104 includes a zero value address logic unit 232 that records a list of physical addresses that are known to be storing zero values. The list is updated at run time. When the zero value address logic 232 detects that a load instruction fetched a zero value for storing into one of the registers 222, the zero value address logic 232 records the physical source address of the load instruction in a zero value address table (ZVAT), since it is now known that the physical source address contains a zero value.

In one implementation, when a load instruction is issued (having the same PC or a different PC), it accesses the ZVAT after its physical address is generated, which typically occurs at the same time as the L1 Data Cache (L1 DC) lookup. If the load instruction's requested data is not in the L1 DC (i.e., the load misses in the L1 DC) and the physical source address of the load is in the ZVAT, then the load does not allocate a miss status holding register (MSHR) and does not issue a miss request to the memory system. Since the physical source address of the load was found in the ZVAT, it is known to store a zero value; accordingly, a zero value is returned as the data to be stored at the destination register of the load instruction (e.g., in one of the registers 222) and the zero flag for the destination register is asserted. If the value is then used as an operand in a consumer instruction, the consumer instruction is converted into a register move instruction as previously described based on the asserted zero flag. In all other cases, where the source address is not in the ZVAT or is in both the ZVAT and the L1 DC, the load completes normally.

Source addresses are removed from the ZVAT when the system detects a memory access directed to the source address that could change the stored zero value to a nonzero value. In one implementation, the load/store unit 207 in the processing unit 104 is used to detect accesses of the source address based on external cache probe traffic it receives. For example, when an "exclusive" or a "modify" access request (i.e., E or M in the modified/owned/exclusive/shared/invalid (MOESI) protocol) directed to the source address is received, then the load/store unit 207 indicates the access to the zero value address logic 232, which invalidates the source address's entry in the ZVAT. Thus, write or modify accesses are indicated to the zero value address logic 232 to cause the accessed address to be removed from the ZVAT, while read-only accesses do not cause the address to be removed. In one implementation, detecting a write or modify access is sufficient to remove the address from the ZVAT, whether the value remains zero or is changed to a nonzero value. That is, the presence of a nonzero value at the address is not necessarily confirmed. Store operations issued by other mechanisms or devices (e.g., the processor core) also cause the ZVAT to be accessed, and their destination addresses are similarly invalidated if they are found in the ZVAT.

Figure 3A:
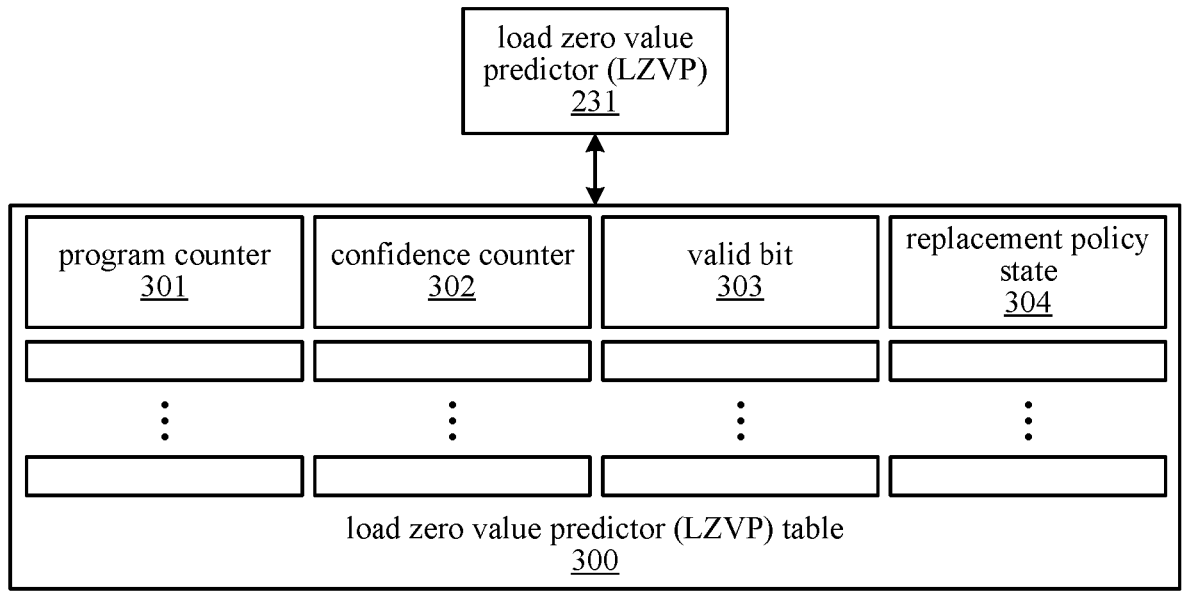
FIG. 3A illustrates an implementation of a load zero value predictor table.

FIG. 3A illustrates an implementation of a load zero value predictor (LZVP) table 300. The LZVP table 300 stores information used by the LZVP 231 to predict when operands will be zeros. Entries in the LZVP table 300 are indexed by the load instructions program counter (PC) value 301, assigning one entry per static load instruction. For the first instance of a load instruction that is fetched and issued, the data fetched from memory for the load is checked to determine whether it is a zero value. If so, then the LZVP table 300 is updated by adding an entry with the load instruction's program counter value 301.

Each entry in the LZVP table 300 associates a confidence counter 302 with the program counter 301. The confidence counter 302 can be any number of bits depending on the maximum confidence value that is desired. The confidence counter 302 is incremented when an instance of the load instruction (as identified by the program counter 301) loads a zero value, and is decreased (decremented or reset) when the load instruction loads a nonzero value. When a load instruction is received, the LZVP 231 checks the confidence counter 302 associated with the load instruction's program counter 301 and, if the confidence counter value 302 exceeds a confidence threshold, predicts that the load instruction will load a zero value.

In addition to the confidence counter 302, each entry of the LZVP table 300 also includes a valid bit 303 and a replacement policy state 304. When asserted, the valid bit indicates that the entry is valid and its confidence counter 302 can be updated and used for predictions. A deasserted valid bit indicates that the entry can be overwritten. The replacement policy state 304 can contain other information for determining which entries to evict from the LZVP table 300 when there are no invalid entries available for overwriting. In one example, the replacement policy state 304 indicates which entries are most recently or least recently created, updated, used for prediction, etc.

Figure 3B:
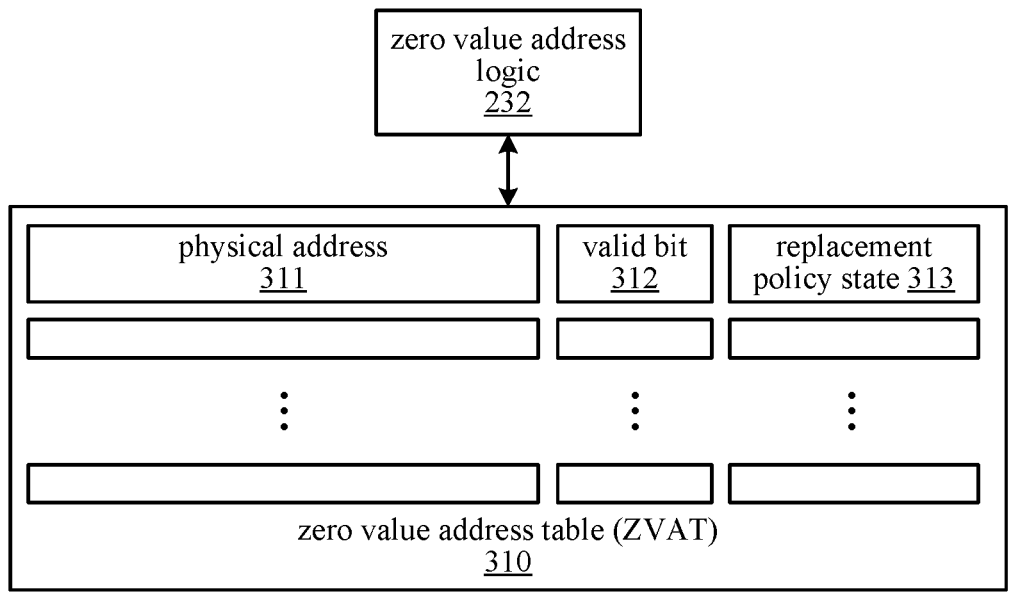
FIG. 3B illustrates an implementation of a zero value address table.

FIG. 3B illustrates an implementation of a zero value address table (ZVAT) 232 that is used to track source addresses that are known to be storing zero values. The ZVAT 310 is accessed by the zero value address logic 232 in response to determining a physical source address of a load instruction. Each entry in the ZVAT 310 includes a physical address 311, a valid bit 312, and replacement policy state 313. The physical address 311 represents a physical source address of a load instruction. The presence of a particular physical address 311 in the ZVAT indicates that the value stored at the physical address 311 is zero. The valid bit 312 for an entry is asserted when the entry is valid and can be used for determining zero values. The valid bit 312 is deasserted when the physical address 311 is determined to no longer contain zero, or when an access has been detected that is likely to have changed the zero value to a nonzero value. Invalid entries can be overwritten with new entries when new physical address are determined to contain zeros. The replacement policy state 313 contains metadata for determining which of the entries are optimally replaced when all of the entries are valid. In one example, the replacement policy state 313 indicates which entries are most recently or least recently created, most frequently or recently used for determining a zero value, etc.

Figure 4:
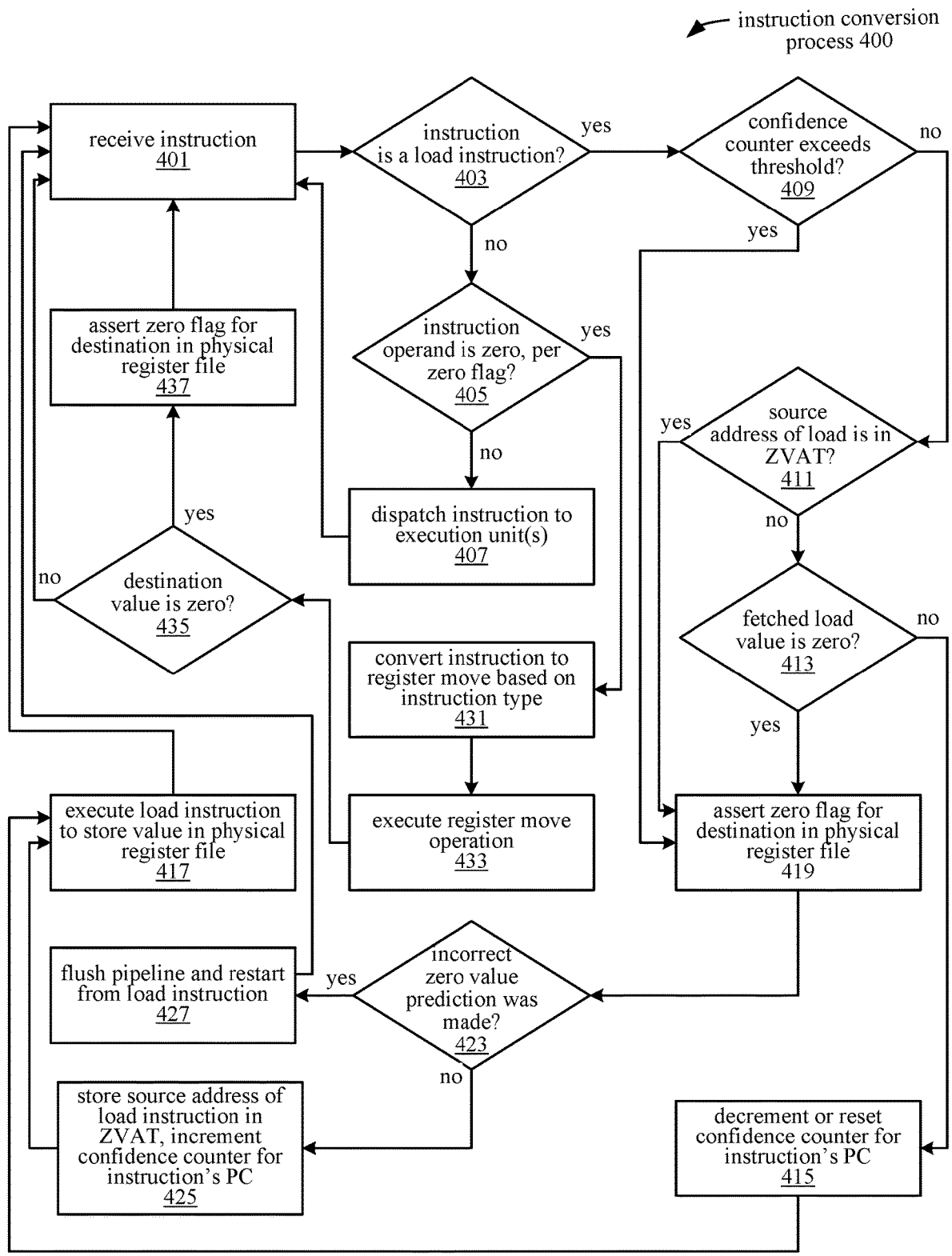
FIG. 4 illustrates a process for converting consumer instructions with zero-valued operands to register move instructions, according to an implementation.

FIG. 4 is a flow diagram illustrating a process 400 for converting consumer instructions into register move operations, according to an implementation. The operations in the process 400 are performed by components in the processing unit 104 illustrated in FIG. 2.

In one implementation, a consumer instruction is preceded in the executable code by a load instruction that loads the operands of the consumer instruction into one or more of the registers 222. The loaded operands are subsequently used by the consumer instruction. When such a load instruction is processed by the pipeline that loads only one or more nonzero operands, then no zero flags 221 are asserted in the physical register file 220. At block 403, the load instruction for loading a nonzero value is fetched and received in the pipeline. The process 400 continues from block 403 to block 409 since the instruction is a load instruction. At block 409, the LZVP 231 predicts whether the value or values loaded by the load instruction are zero based on whether the confidence counter associated with the load instruction's program counter value exceeds a threshold confidence level. This determination can happen in the decode stage as soon as the program counter value is known. For the first instance of the load instruction being processed, the confidence counter does not exceed the threshold because the instruction's program counter value has not been added to the LZVP table 300 and there is no confidence counter value. Also, if a prior instance of the instruction did not load a zero value, its program counter would not have been added to the LZVP table 300 and would not have a confidence counter. The process 400 therefore continues at block 411.

At block 411, the zero value address logic 232 determines whether the physical source address of the load instruction was previously recorded in the ZVAT 310. This determination can occur as soon as the physical source address for the load is calculated (e.g., after the load has been issued to the data translation lookaside buffer (DTLB) to obtain its physical address, after execution unit 206 in FIG. 2). The first time the physical source address is encountered, it has not yet been added to the ZVAT 310. Also, if the physical source address was previously found to contain a nonzero value, it would not be in the ZVAT 310. Accordingly, the process 400 continues from block 411 to block 413. At block 413, the value is fetched from the physical source address of the load instruction. For the present load instruction, the load value is not zero, so the process 400 continues at block 415.

At block 415, the confidence counter value associated with the program counter of the load instruction, if it exists, is decremented or reset since the load value is not zero. A confidence counter does not exist for the present load instruction, so no action is taken. In other cases, a confidence counter associated with the load instruction already exists in the LZVP table 300 if one or more prior instances of the load instruction had loaded a zero value and caused the program counter to be added to the LZVP table 300 and possibly incremented. Accordingly, the LZVP 231 decrements any existing confidence counter value or alternatively, sets the confidence counter value to zero. In an alternative implementation, the LZVP 231 resets the confidence counter by invalidating its entry in the LZVP table 300 (i.e., by deasserting its valid bit 303). At block 417, the load instruction is executed to load the fetched value into the destination register in the physical register file 220. From block 417, the process 400 returns to block 401 to continue receiving and processing instructions.

The nonzero value loaded by the load instruction is in some cases an operand for a consumer instruction that has no zero-valued operands. When the consumer instruction that has no zero-valued operands is fetched and decoded by the pipeline, none of its operands are determined to be zero, and the consumer instruction is processed in the execution unit 206 without being converted to a register move operation. Beginning at block 401, the consumer instruction is fetched and is received in the pipeline. At block 403, since the instruction is not a load instruction, the process continues from block 403 to block 405. When the operand addresses of the instruction are known (i.e., when the instruction reaches the dispatch unit 205), the zero detection logic 210 checks the addresses in the physical register file 220 to determine whether any zero flags are asserted for the operand addresses. Since the consumer instruction has only nonzero operands, no zero flags are asserted, and the process 400 continues from block 405 to block 407. Since there are no zero valued operands, the consumer instruction is not a candidate for converting to a register move instruction and is dispatched to the instruction scheduler and execution unit 407 for execution. The process 400 continues at block 401 to continue receiving and processing instructions.

The execution of a consumer instruction having one or more zero-valued operands is preceded by a load instruction that loads the one or more zero-valued operands into the physical register file 220 prior to execution. For this load instruction, the process 400 continues from block 403 to block 409. The first time a load instruction with a given program counter is processed, there is no confidence counter value since the program counter has not yet been added to the LZVP table 300. Accordingly, at block 409, the confidence counter does not exceed the threshold and the process 400 continues at block 411.

Similarly, the first time the physical source address of the load instruction is encountered, it has not yet been added to the ZVAT 310, even if it contains a zero. Accordingly, the process 400 continues from block 411 to block 413. At block 413, when the load value is fetched from the memory hierarchy and is thus determined to be zero, the process 400 continues from block 413 to block 419. At block 419, since the actual load value was determined to be zero, the zero detection logic 210 asserts the zero flag associated with the destination register of the load instruction.

At block 423, after the actual load value is fetched, the LZVP 231 can determine whether any predictions it made were correct. This could occur after a consumer instruction using the predicted zero as an operand has already been speculatively converted to a register move operation. For the present example load instruction, the value was determined to be zero based on the fetched load value rather than based on a prediction. Therefore, no incorrect zero value prediction was made, and the process 400 continues at block 425.

Since the physical source address of the load instruction was determined to be storing a zero, the zero value address logic 232 records the source address in the ZVAT 310 at block 425. Also, since the load instruction loaded a zero value, the LZVP 231 creates an entry in the LZVP table 300, if one does not exist already, to store the program counter of the load instruction. In addition, the LZVP 231 also increments the new or existing confidence counter that is associated with the program counter upon detecting that the load instruction stored a zero value in the physical register file 220. At block 417, the load instruction is executed to store the fetched load value into its destination register in the physical register file 220. The process 400 returns to block 401 to continue processing instructions.

Since it was determined that the load instruction was for loading a zero value into the physical register file 220, the physical source address where the zero was stored was added to the ZVAT 310. When a subsequent load instruction attempts to load a value from the same address, the zero value address logic 232 can determine that the value is zero by locating the source address in the ZVAT 310 without fetching the value from the memory hierarchy (assuming that no "exclusive" or "modify" access of the source address was detected since the address was added). In this case, the process 400 continues from block 411 to block 419. At block 419, in response to the zero value address logic 232 determining that the source address of the load instruction is recorded in an entry of the ZVAT 310, the zero detection logic 210 asserts the zero flag for the destination register specified by the load instruction. At block 423, no zero value prediction was made, so the process 400 continues at block 425.

Block 425 provides for the storing of the source address of the load instruction in the ZVAT 310 and incrementing of the confidence counter associated with the load instruction's program counter. Since the source address of the load instruction is already in the ZVAT 310, no new entry is created. The confidence counter is incremented since the load instruction will load a zero value. At block 417, the load instruction is executed to load the value into the physical register file. The load value is fetched from the memory hierarchy or determined to be zero based on the presence of the physical source address in the ZVAT 310. From block 417, the process 400 returns to block 401 to continue processing instructions.

Since the prior load instruction loaded a zero value, the program counter of the load instruction was added to the LZVP table 300 as described above. When subsequent instances of the load instruction with the same program counter value are executed, the confidence counter associated with the program counter in the LZVP table is incremented at block 425. When the confidence counter value exceeds a confidence threshold, the LZVP 231 predicts that load instructions having the associated program counter value will load a zero value. Accordingly, at block 409, when the confidence counter for the load instruction exceeds the threshold, the process 400 continues at block 419. At block 419, the zero detection logic 210 speculatively asserts the zero flag associated with the destination register of the load instruction.

When the actual load value has been fetched from memory hierarchy, then it can be determined whether the zero value prediction was correct. If the fetched value is also zero, then the prediction is correct and the process 400 continues at block 425 to update the ZVAT 300 and confidence counter as appropriate. If the fetched value is not zero, then the zero prediction is incorrect, and the process 400 continues at block 427. At block 427, the pipeline is flushed and processing is restarted from the load instruction that caused the misprediction. The process 400 returns to block 401 to continue processing.

When the zero value that is loaded or will be loaded by the load instruction is used as an operand by a consumer instruction, the asserted zero flag associated with the register in which the zero value is stored indicates to the zero detection logic 210 that the consumer instruction can be converted to a register move instruction. At block 403, since the consumer instruction is not a load instruction, the process 400 continues at block 405. At block 405, the zero detection logic 210 checks the zero flags associated with the registers that contain the consumer instruction's source operands to determine whether any of the operands are zero. When at least one of the operands is zero, the process 400 continues at block 431.

At block 431, the instruction conversion logic 211 converts the consumer instruction to a register move instruction based on the type of operation (e.g., add, multiply, logical AND, etc.) that the consumer instruction represents. In one implementation, the operand of the register move operation is determined based on the type of consumer instruction that is being converted, and the destination register of the register move is the same as the destination register of the original consumer instruction. For example, a consumer instruction representing a multiply operation with at least one zero operand is converted to a register move operation that moves a zero value into the destination register. A consumer instruction representing an add operation that has only one nonzero operand and remaining operands that are zero is converted to a register move operation that moves the nonzero operand to the destination register. A logical AND instruction with a zero operand is converted to a register move that moves a zero to the destination register. In one implementation, the different operation types and the corresponding register move operations to which they can be converted are stored in memory accessible to the instruction conversion logic 211 or are otherwise encoded in the logic 211.

The instruction conversion logic 211 can also recognize and convert some vectorized consumer instructions with zero-valued operands to vectorized register move instructions with destination registers in a vector physical register file. For example, a multiplication operation that multiplies a vector of nonzero operands with a scalar zero or a vector of zero-valued operands can be converted to a vectorized register move operation that moves a vector of zeros into the destination registers.

The dispatch unit 205 places each instruction into an instruction queue to wait for execution. Instructions not being converted to register move operations are queued until their operands are ready, then scheduled and executed in the execution unit 206. In contrast, consumer instructions to be converted to register moves are removed from the queue and sent to the instruction conversion logic 211 instead of the instruction scheduler and execution unit 206. At block 433, the generated register move instruction is executed in the physical register file 220, effecting the same result as the original consumer instruction if the original consumer instruction had been executed, but without consuming pipeline resources in the instruction scheduler and execution unit 206.

The result value that is written into the destination register by the register move operation will often also be zero; for example, a multiplication operation with one zero operand results in a zero being written to the destination register. Accordingly, the zero flag is asserted for the destination register, even though there is not a separate load instruction to trigger the assertion of the zero flag. Therefore, at block 435, if the zero detection logic 210 detects that the destination value of the register move is zero, it asserts the zero flag for the destination register in the physical register file, as provided at block 437. If the destination value of the register move operation is a nonzero value, the process 400 returns from block 435 to block 401 to continue processing instructions without asserting the zero flag for the destination register.

Figure 5:
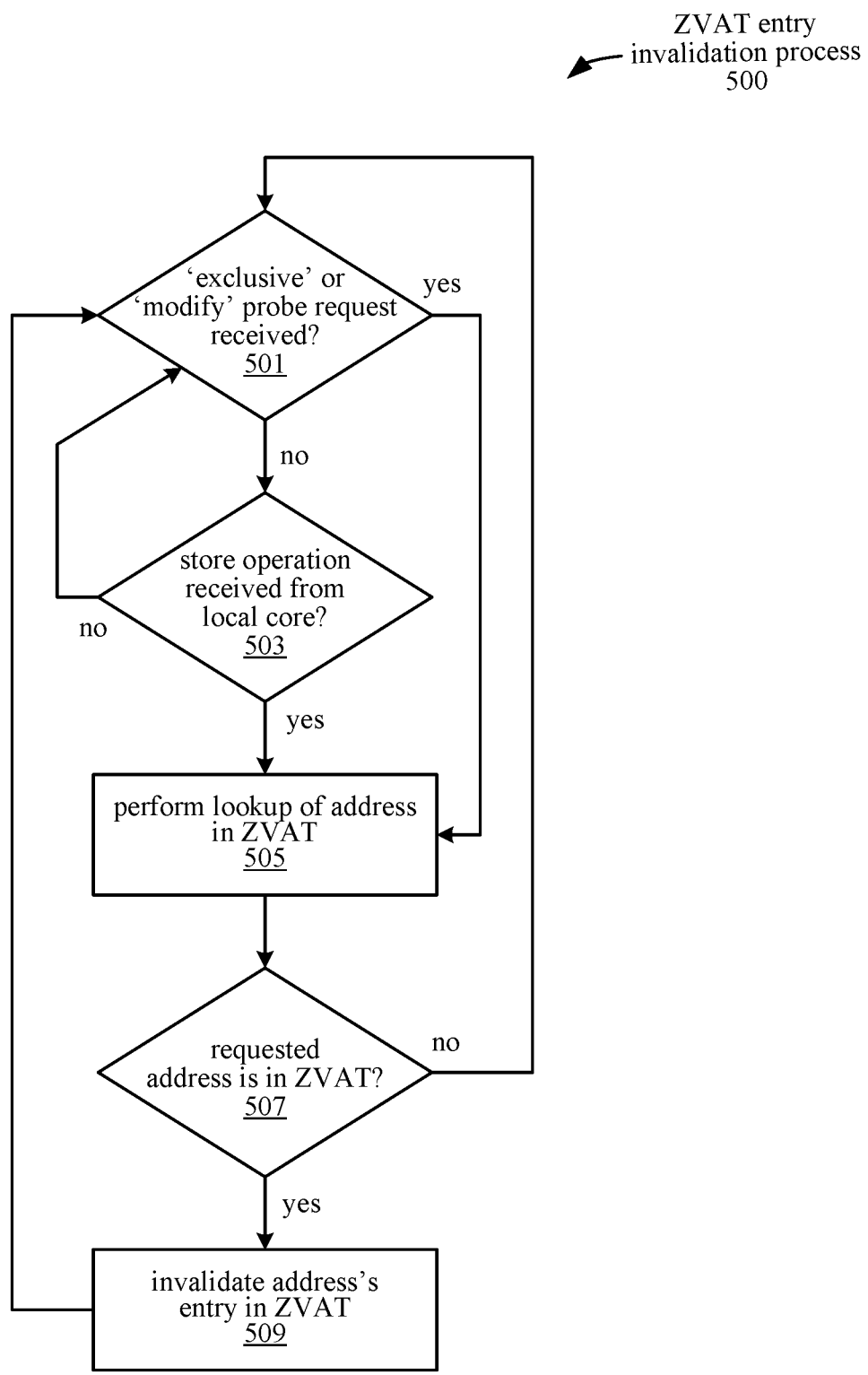
FIG. 5 illustrates a process for invalidating entries in a zero value address table, according to an implementation.

FIG. 5 illustrates an implementation of a process 500 for invalidating an entry in the ZVAT 310. The process 500 is performed by components in the computing system 100, such as cache controllers or other memory controllers in the memory subsystem 201, the zero value address logic 232, etc. The zero value address logic 232 stores physical addresses in the ZVAT 310 when it determines that the addresses are storing zero values. When the values stored in the physical addresses are modified, whether or not they are zero is no longer known and their entries are therefore removed from the ZVAT 310. The ZVAT entry invalidation process 500 detects accesses that could change the values in the physical addresses recorded in the ZVAT 310 and responds by invalidating their entries in the ZVAT 310. In one implementation, values stored at a given physical address in the memory hierarchy can be modified by store operations issued from a local processing core (e.g., processing core 104) or by threads executing in other processing cores, for example, via external probe traffic.

In one implementation, a remote processing core transmits a probe request to control logic (e.g., cache controllers, etc.) in the memory hierarchy to access a physical memory location in the memory hierarchy. There are different types of probe requests, and each probe request includes metadata that indicates its type. Some types are used when the remote processing core attempts to modify the data at the physical address, while others do not modify the data. For example, following the MOESI cache coherency protocol, 'exclusive' and 'modify' probe types indicate intent to modify the data while other types such as 'shared' do not show intent to modify the data. In addition, the data can be modified by store operations issued from the local processing core 104.

At block 501, if no 'exclusive' or 'modify' probe is received in the memory hierarchy (e.g., by a cache controller local to the processing core 104), then the process 500 continues at block 503. At block 503, if no store operation is received from the local processing core, then the processor 500 returns to block 501. Blocks 501 and 503 are thus repeated until an 'exclusive' or 'modify' probe request or a store operation from the local processing core is received. When an 'exclusive' or 'modify' probe request or a store operation from the local processing core is received, the process 500 continues to block 505 from 501 or 503, respectively.

At block 505, the zero value address logic 232 performs a lookup in the ZVAT 310 of the physical address to which access is requested by the probe request or the store operation. At block 507, if the physical address is not found in an entry of the ZVAT 310, the process 500 returns to block 501 without invalidating any entries in the ZVAT 310. If the address is recorded in an entry of the ZVAT 310, then the entry is invalidated, as provided at block 509. In one implementation, the entry is invalidated regardless of whether or not the value at the address was changed to a nonzero value. If the value remained zero after the detected access, the address is added back to the ZVAT 310 the next time a load instruction loads the zero value from the address. From block 509, the process 500 returns to block 501 to continue invalidating entries in the ZVAT 310 in response to access requests directed to their physical addresses.

A processing device includes a zero detection circuit to determine that an operand of a first instruction is zero and instruction conversion logic coupled with the zero detection circuit to, in response to the zero detection circuit determining that the operand is zero, convert the first instruction to a register move instruction executable by the processing device.

The processing device further includes a physical register file to store a plurality of zero flags each associated with one of a plurality of addresses in the physical register file. The zero detection circuit, in response to determining that a load instruction for storing the operand at a destination address in the physical register file is for storing a zero value, asserts a zero flag of the plurality of zero flags that is associated with the destination address. The zero detection circuit determines that the operand is zero by determining that the zero flag is asserted.

In the processing device, the zero detection logic, when execution of the register move instruction causes a zero value to be stored in the destination register, asserts a zero flag associated with a destination register of the register move instruction.

The processing device further includes a load zero value predictor circuit coupled with the instruction conversion logic to, in response to detecting that a first instance of a load instruction is for storing a zero value, increment a confidence counter associated with a program counter of the load instruction, and in response to detecting that a second instance of the load instruction stores a nonzero value, decrease the confidence counter.

In the processing device, the load zero value predictor further, in response to a third instance of the load instruction, asserts a zero flag associated with a destination register of the load instruction when the confidence counter associated with the program counter of the load instruction exceeds a confidence threshold. The zero detection circuit determines that the operand is zero by determining that the zero flag is asserted.

In the processing device, the load zero value predictor circuit predicts that the operand value is zero based on the confidence counter. The processing device further includes pipeline flush logic to perform a pipeline flush in response to determining that an actual value of the operand value is nonzero.

The processing device further includes zero value address logic coupled with the zero detection circuit to, in response to detecting that a first instance of a load instruction is for storing a zero value, record a source address of the first instance of the load instruction in an entry of a zero value address table (ZVAT), and in response to detecting a request to access the source address, invalidate the entry.

In the processing device, the zero value address logic further detects the request to access the source address by detecting one of an exclusive access request and a modify access request directed to a cache entry for the source address.

In the processing device, the instruction conversion logic further determines an operand of the register move instruction based on an operation type of the first instruction, where the operation type is one of an add, multiply, subtract, and logical AND operation type.

In the processing device, the first instruction is a vectorized instruction, and the register move instruction is a vectorized register move instruction with a destination register in a vector physical register file.

A computing system includes a memory to store an operand for a first instruction, and a processing unit coupled with the memory to, in response to receiving the first instruction, determine that the operand is zero, in response to determining that the operand is zero, convert the first instruction to a register move instruction, and execute the register move instruction.

In the computing system, the memory includes a physical register file storing a plurality of zero flags each associated with one of a plurality of addresses in the physical register file. The processing unit further, in response to determining that a load instruction for storing the operand at a destination address in the physical register file is for storing a zero value, asserts a zero flag of the plurality of zero flags that is associated with the destination address. The processing unit determines that the operand is zero by determining that the zero flag is asserted.

The computing system further includes a zero value address table (ZVAT). The processing unit includes zero value address logic to, in response to determining that a first load instruction is for storing a zero value, record a source address of the first load instruction in an entry of the ZVAT, and in response to determining that a source address of a second load instruction is recorded in an entry of the ZVAT, assert a zero flag associated with a destination address of the second load instruction.

A method includes receiving a first instruction in a processing unit, determining that an operand of the first instruction is zero, and in response to determining that the operand is zero, converting the first instruction to a register move instruction executable by the processing unit.

The method further includes, in response to determining that a load instruction for storing the operand at an address in a physical register file is for storing a zero value, asserting a zero flag associated with the address. Determining that the operand is zero includes determining that the zero flag associated with the operand is asserted.

The method, further includes, when execution of the register move instruction causes a zero value to be stored in the destination register, asserting a zero flag associated with a destination register of the register move instruction.

The method further includes, in response to detecting that a first instance of a load instruction is for storing a zero value, incrementing a confidence counter associated with a program counter of the load instruction, and in response to detecting that a second instance of the load instruction stores a nonzero value, decreasing the confidence counter.

The method further includes, in response to a third instance of the load instruction, asserting a zero flag associated with a destination register of the load instruction when the confidence counter associated with the program counter of the load instruction exceeds a confidence threshold. Determining that the operand is zero includes determining that the zero flag is asserted.

The method further includes, in response to detecting a first load instruction storing a zero value in a physical register file, recording a source address of the first load instruction in an entry of a zero value address table (ZVAT), and based on detecting a request to access the source address, invalidating the entry.

In the method, detecting the request to access the source address comprises detecting one of a store instruction, an exclusive access request, and a modify access request directed to the source address.

The method further includes in response to a second load instruction, determining that the source address of the second load instruction is recorded in an entry of the ZVAT, and in response to determining that the source address of the second load instruction is recorded in the entry, asserting a zero flag associated with a destination address of the second load instruction.

As used herein, the term "coupled to" means coupled directly or indirectly through one or more intervening components. Any of the signals provided over various buses described herein can be time multiplexed with other signals and provided over one or more common buses. Additionally, the interconnection between circuit components or blocks may be shown as buses or as single signal lines. Each of the buses can alternatively be one or more single signal lines and each of the single signal lines may alternatively be buses.

Certain implementations are implemented as a computer program product that includes instructions stored on a non-transitory computer-readable medium. These instructions are used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium can include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some implementations are practiced in distributed computing environments where the computer-readable medium is stored on and/or executed by more than one computer system. In addition, the information transferred between computer systems are either pulled or pushed across the transmission medium connecting the computer systems.

Generally, a data structure representing the computing system 100 and/or portions thereof carried on the computer-readable storage medium is a database or other data structure which can be read by a program and used, directly or indirectly, to fabricate the hardware including the computing system 100. In one example, the data structure is a behavioral-level description or register-transfer level (RTL) description of the hardware functionality in a high level design language (HDL) such as Verilog or VHDL. The description is read by a synthesis tool which synthesizes the description to produce a netlist including a list of gates from a synthesis library. The netlist includes a set of gates which also represent the functionality of the hardware including the computing system 100. The netlist is then placed and routed to produce a data set describing geometric shapes to be applied to masks. The masks are then used in various semiconductor fabrication steps to produce a semiconductor circuit or circuits corresponding to the computing system 100. Alternatively, the database on the computer-readable storage medium is the netlist (with or without the synthesis library) or the data set, as desired, or Graphic Data System (GDS) II data.

Although the operations of the method(s) herein are shown and described in a particular order, the order of the operations of each method can be altered so that certain operations are performed in an inverse order or so that certain operations are performed, at least in part, concurrently with other operations. In another implementation, instructions or sub-operations of distinct operations are performed in an intermittent and/or alternating manner.

In the foregoing specification, the implementations have been described with reference to specific exemplary implementations thereof. It will, however, be evident that various modifications and changes can be made thereto without departing from the broader scope of the implementations as set forth in the appended claims. The specification and drawings are, accordingly, to be regarded in an illustrative sense rather than a restrictive sense.

What is claimed is:

1. A processing device, comprising:
   a zero value address logic circuit configured to, in response to detecting that a first instance of a load instruction is for storing a zero value, record a source address of the first instance of the load instruction;
   a zero detection circuit configured to determine that an operand of a first instruction is zero based on the recorded source address; and
   an instruction conversion logic circuit coupled with the zero detection circuit and configured to, in response to the zero detection circuit determining that the operand is zero, convert the first instruction to a register move instruction executable by the processing device.

2. The processing device of claim 1, further comprising:
   a physical register file configured to store a plurality of zero flags each associated with one of a plurality of addresses in the physical register file, wherein the zero detection circuit is further configured to, in response to determining that a load instruction for storing the operand at a destination address in the physical register file is for storing a zero value, assert a zero flag of the plurality of zero flags that is associated with the destination address, wherein the zero detection circuit is configured to determine that the operand is zero by determining that the zero flag is asserted.

3. The processing device of claim 1, wherein:
the zero detection circuit is further configured to, when execution of the register move instruction causes a zero value to be stored in a destination register of the register move instruction, assert a zero flag associated with the destination register of the register move instruction.

4. The processing device of claim 1, further comprising:
a load zero value predictor circuit coupled with the instruction conversion logic circuit and configured to:
in response to detecting that the first instance of the load instruction is for storing a zero value, incrementing a confidence counter associated with a program counter of the load instruction; and
in response to detecting that a second instance of the load instruction stores a nonzero value, decreasing the confidence counter.

5. The processing device of claim 4, wherein:
the load zero value predictor circuit is further configured to, in response to a third instance of the load instruction, assert a zero flag associated with a destination register of the load instruction when the confidence counter associated with the program counter of the load instruction exceeds a confidence threshold, wherein the zero detection circuit is configured to determine that the operand is zero by determining that the zero flag is asserted.

6. The processing device of claim 4, wherein:
the load zero value predictor circuit is further configured to predict that the operand is zero based on the confidence counter; and
the processing device further comprises a pipeline flush logic circuit configured to perform a pipeline flush in response to determining that an actual value of the operand is nonzero.

7. The processing device of claim 1, wherein:
the zero value address logic circuit is further configured to:
record the source address of the first instance of the load instruction in an entry of a zero value address table (ZVAT), and
in response to detecting a request to access the source address, invalidate the entry.

8. The processing device of claim 7, wherein:
the zero value address logic circuit is further configured to detect the request to access the source address by detecting one of an exclusive access request and a modify access request directed to a cache entry for the source address.

9. The processing device of claim 1, wherein the instruction conversion logic circuit is further configured to:
determine an operand of the register move instruction based on an operation type of the first instruction, wherein the operation type is one of an add, multiply, subtract, and logical AND operation type.

10. The processing device of claim 1, wherein:
the first instruction is a vectorized instruction; and
the register move instruction is a vectorized register move instruction with a destination register in a vector physical register file.

11. A computing system, comprising:
a memory configured to store an operand for a first instruction; and
a processor coupled with the memory and comprising a zero value address logic circuit configured to, in response to determining that a first instance of a load instruction is for storing a zero value, record a source address of the first instance of the load instruction, wherein the processor is further configured to:
in response to receiving the first instruction, determine that the operand is zero based on the recorded source address,
in response to determining that the operand is zero, convert the first instruction to a register move instruction, and
execute the register move instruction.

12. The computing system of claim 11, wherein:
the memory comprises a physical register file storing a plurality of zero flags each associated with one of a plurality of addresses in the physical register file, wherein the processor is further configured to, in response to determining that a load instruction for storing the operand at a destination address in the physical register file is for storing a zero value, assert a zero flag of the plurality of zero flags that is associated with the destination address, wherein the processor is configured to determine that the operand is zero by determining that the zero flag is asserted.

13. The computing system of claim 11, further comprising:
a zero value address table (ZVAT), wherein the zero value address logic circuit configured to:
record the source address of the first load instruction in an entry of the ZVAT, and
in response to determining that a source address of a second load instruction is recorded in an entry of the ZVAT, assert a zero flag associated with a destination address of the second load instruction.

14. A method, comprising:
in response to detecting that a first instance of a load instruction is for storing a zero value, recording a source address of the first instance of the load instruction;
in response to receiving a first instruction in a processor, determining that an operand of the first instruction is zero based on the recorded source address; and
in response to determining that the operand is zero, converting the first instruction to a register move instruction executable by the processor.

15. The method of claim 14, further comprising:
in response to determining that a load instruction for storing the operand at an address in a physical register file is for storing a zero value, asserting a zero flag associated with the address,
wherein determining that the operand is zero comprises determining that the zero flag associated with the operand is asserted.

16. The method of claim 14, further comprising:
when execution of the register move instruction causes a zero value to be stored in a destination register, asserting a zero flag associated with the destination register of the register move instruction.

17. The method of claim 14, further comprising:
in response to detecting that the first instance of the load instruction is for storing a zero value, incrementing a confidence counter associated with a program counter of the load instruction; and
in response to detecting that a second instance of the load instruction stores a nonzero value, decreasing the confidence counter.

18. The method of claim 17, further comprising:

in response to a third instance of the load instruction, asserting a zero flag associated with a destination register of the load instruction when the confidence counter associated with the program counter of the load instruction exceeds a confidence threshold, wherein the determining that the operand is zero comprises determining that the zero flag is asserted.

19. The method of claim 14, wherein:

in the first instance of the load instruction is for storing the zero value in a physical register file, and the source address of the first instance of the load instruction is recorded in an entry of a zero value address table (ZVAT); and the entry is invalidated based on detecting a request to access the source address.

20. The method of claim 19, wherein:

detecting the request to access the source address comprises detecting one of a store instruction, an exclusive access request, and a modify access request directed to the source address.

21. The method of claim 19, further comprising:

in response to a second load instruction, determining that a source address of the second load instruction is recorded in an entry of the ZVAT; and in response to determining that the source address of the second load instruction is recorded in the entry, asserting a zero flag associated with a destination address of the second load instruction.

\* \* \* \* \*